April 2, 1963  S. DE JONG ET AL  3,083,783

STEERING MECHANISM

Filed Sept. 6, 1960

INVENTORS
RAIMUNDS AUZINS &
BY SIJTZE DE JONG

Dale A. Winnie
ATTORNEY

United States Patent Office 3,083,783
Patented Apr. 2, 1963

3,083,783
STEERING MECHANISM
Sijtze de Jong, Marion, Ohio, and Raimunds Auzins, South Bend, Ind., assignors to Curtiss-Wright Corporation, South Bend, Ind., a corporation of Delaware
Filed Sept. 6, 1960, Ser. No. 54,129
3 Claims. (Cl. 180—79.2)

This invention relates to steering mechanisms in general and more particularly to power steering means for heavy duty vehicles.

The present invention is particularly adapted for use with heavy duty land vehicles, such as earth movers, which include a motor powered tractor having a rearwardly disposed trailer coupled to the frame of the tractor by means of a king pin assembly. Where the tractor is provided with two wheels, driven through the customary transmission and differential gearing, power steering forces applied between the frames of the tractor and trailer are effective in turning the tractor to the desired steering angle.

Heretofore, heavy duty off-highway two-axle vehicles which steer by rotating the front axle and usually, therefor, the entire tractor, have accomplished this objective by one of two methods. The first of these methods includes the use of double-acting hydraulic cylinders which are connected directly between the tractor and trailer units. The other system usually includes single vane hydraulic motors driving a gear and pinion assembly.

The steering system which makes use of hydraulic cylinders, as conventionally known, requires long-stroke cylinders to connect the tractor and trailer components together. Further, the cylinders are usually required to be geometrically arranged to avoid interference with the king pin assembly. It will be appreciated that with such a steering connection, the effective moment arm of the power cylinders, relative to the axis of the connection between the tractor and trailer units, changes sufficiently to cause an undesirable variation in the amount of steering torque in the course of manuvering a turn.

The hydraulic motor steering system makes use of a gear ratio steering arrangement about the king pin connection between the tractor and trailer units and which is operated by hydraulic motor units. Although this arrangement enables a more constant steering torque to be obtained, it will be appreciated that the system is initially more expensive and presents more problems as regards service and maintenance.

It is an object of this invention to teach means of readily obtaining the advantages of the two commonly known and accepted power steering systems for heavy duty vehicles, such as last described, within a combination structure providing a different power steering mechanism and one more suitable for use in this field.

The power steering system of this invention provides relative rapid steering action and essentially constant steering torque.

The power steering system of this invention makes use of short-stroke double-acting hydraulic cylinders of known sturdy construction and serviceability as a drive power source. Such short-stroke cylinders are obviously less expensive and less prone to damage than long-stroke power cylinder means.

The power steering system of this invention makes use of short-stroke power cylinders which are geometrically arranged to minimize any change in the effective moment arm of such drive means and accordingly more assuredly provide a substantially constant steering torque.

The power steering system of this invention makes use of a planetary gear arrangement about the tractor-trailer king pin connection in combination with externally disposed and operatively connected power cylinder means affecting steering control therethrough.

The power steering system of this invention includes a planetary gear arrangement for use with a king pin steering connection and susceptible to external control to obtain the desired steering action.

As will be shown, the geometrical arrangement of the short-stroke power cylinders and their operative connection to the receptive planetary gear set enables a relatively short power stroke to effectively produce a resultant larger steering angle.

These and other objects and advantages of this invention will be more apparent upon reading and studying the following description of a preferred embodiment of the invention as set forth in detail and in conjunction with the accompanying drawings.

Figure 1:
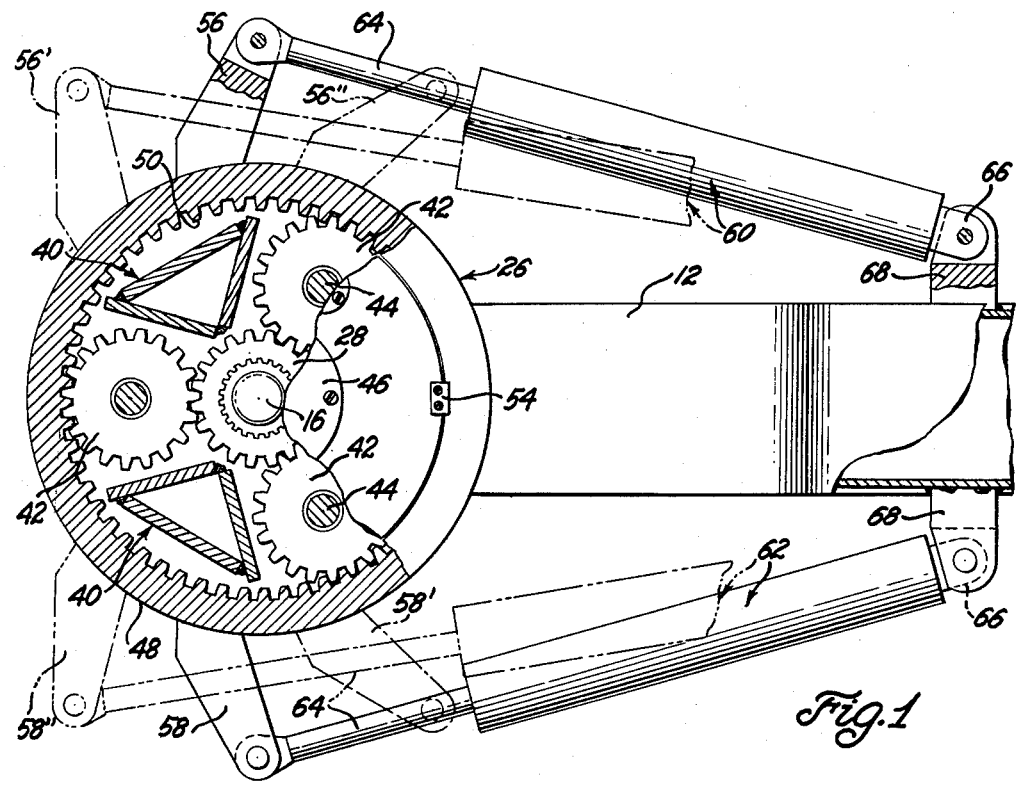
FIGURE 1 is a top plan view of the steering mechanism of this invention as seen with certain parts removed and others shown in cross section. Still other parts are shown in phantom outline in operatively advanced or retracted positions.

The power steering means of this invention is best suited for use with heavy duty vehicles such as earth movers of the type disclosed in Clark Reissue 23,251. Such a vehicle includes a motor powered two-wheeled tractor having an earth moving trailer connected thereto. The present drawings show a cross beam 10, which is part of the tractor frame, coupled to a goose neck connection 12, which is part of the trailer frame. The king pin assembly 14 serves to couple the tractor and trailer members together for steering movements about a vertical axis and is such as permits relative freedom of horizontal movement to accommodate changes in the terrain over which the tractor and trailer units travel.

The king pin assembly 14 includes a king pin member 16 which is vertically disposed and includes a yoke end 18. The yoke end 18 is secured by means of a horizontally disposed pivot pin connection 20 to the tractor cross beam 10. This connection permits horizontal oscillation of the vehicle tractor relative to the vehicle trailer.

Figure 2:
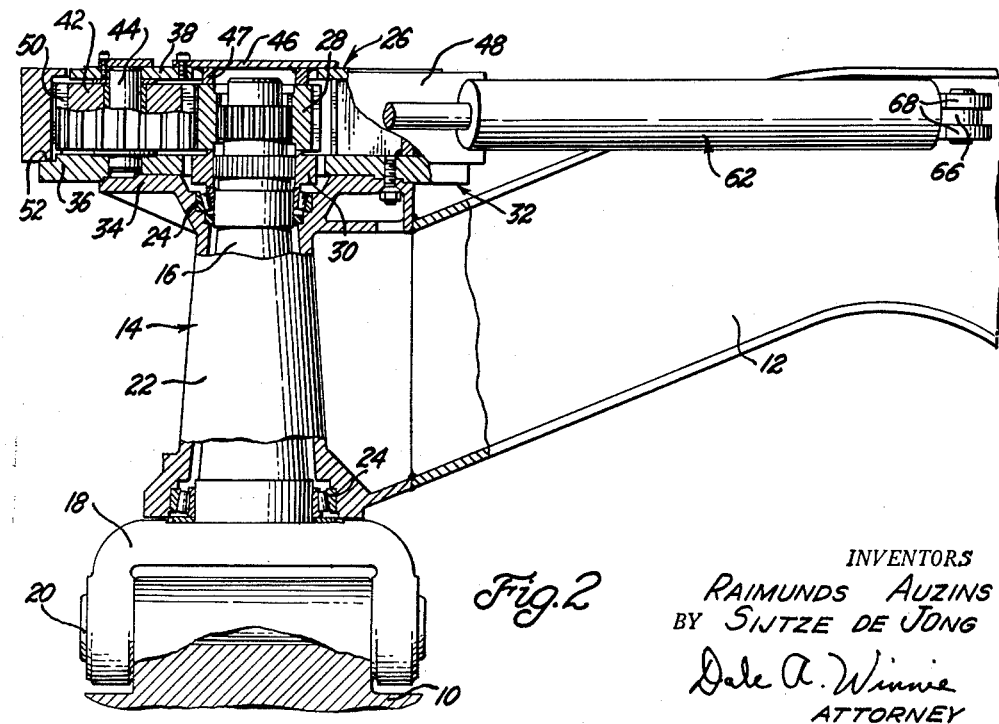
FIGURE 2 is a side plan view of the steering assembly shown by FIGURE 1 and again having certain parts cut away and shown in cross section for better illustration thereof.

It will be appreciated that the disposition of the king pin yoke 18 in FIGURE 2 is that assumed when the tractor wheels are not turned relative to the goose neck trailer connection 12.

A hub member 22, in the form of a sleeve, is journalled for relative rotation on the king pin member 16 by means of bearings 24. The hub portion 22 is secured to the goose neck connection 12 of the vehicle trailer, as best shown by FIGURE 2. This arrangement enables the relative movement of the tractor and trailer members about the vertical axis of the king. As mentioned, power steering forces applied between the frames of the tractor and trailer, or such as these components respectively connected thereto, are effective in turning the tractor to a desired steering angle relative to the trailer.

The tractor-trailer connection which has been thus far described is generally known and well accepted in the earth moving equipment field.

In the present invention, a planetary gear assembly 26 is incorporated with the king pin assembly 14 near the upper end thereof.

The king pin member 16 is formed to include a spline connection for receiving a pinion gear 28 near the upper end thereof. The pinion gear 28 serves as a sun gear in the planetary gear assembly 26. It is axially positioned on its underside by a spacer and bearing retainer member 30 which is splined or press fitted on the king pin member 16.

A planetary gear carrying member 32 is secured to a flange 34 which is provided on the hub member 22. The carrier 32 includes horizontally disposed and parallel spaced upper and lower walls 36 and 38 having triangulated spacers and structural reinforcing members 40 secured therebetween.

Planetary pinion gears 42 are rotatably mounted on pins 44 which extend through the cover wall 38 and are secured thereto. The pinion gear shafts or pins 44 extend into receptive openings provided in the bottom wall 36 of the gear carrier structure.

A sun gear cover plate 46 is secured to the upper wall of the gear carrier 32 and is formed to include an annular ring 47 which assists in axially positioning the sun gear pinion 28. The cover plate enables ready inspection of the sun gear 28 and planetary gears 42 which are engaged thereto.

A ring gear 48 is concentrically disposed about the sun gear 28 and planetary gears 42. The ring gear 48 is supported on a shoulder 52 of the gear carrier 32 and includes internal gear teeth 50 for engagement with the planetary gears 42. Locking members 54 are secured to the gear carrier 32 and overlap the ring gear 48 for retaining it operatively positioned in the planetary gear system.

The outer periphery of the ring gear 48 is exposed and receptive to having suitable drive means connected thereto to effect rotation thereof. Lever arms 56 and 58 are secured to the ring gear 48 on diametrically opposite sides thereof for this purpose. The lever arms are of a bell crank shape for greater structural strength. It will also be appreciated that the lever arms are preferably arranged tangentially of the sun gear 30 and on the tractor side thereof for more proficient turning control.

Hydraulic cylinders 60 and 62 are secured between the lever arms 56 and 58 and the goose neck trailer connection 12. The piston rods 64 of the hydraulic cylinders are secured to the lever arms and connectors 66 at the ends of the cylinders are secured to support brackets 68 provided on the trailer connection 12.

Lever arms 56 and 58 extend sufficiently from the sides of the ring gear 48 to enable the piston rods 64 to be connected thereto without interference with the ring gear in the course of advancing or retracting the same. The phantom positions 56' and 58' show lever positions for cylinder actuation effecting a turn in one direction and the phantom outlined lever arms identified 56" and 58" illustrate a turn in the opposite direction.

It will be appreciated that a relatively short stroke is required of the power cylinders 60 and 62 to effect an appreciable change in the steering angle through the planetary gear connection 26 to the king pin assembly 12. Accordingly, there is a minimum reduction in the moment arm during the advancement or retraction of the ring gear 48 to effect a required steering angle change. Therefore, the disclosed arrangement enables a relatively constant steering torque about the center line of the king pin 16.

In the course of power steering operation, as one of the cylinders 60 and 62 is actuated to push its respective lever arm 56 or 58, the other cylinder is actuated to pull the other lever arm, the ring gear is rotated clockwise or counter-clockwise and a gear ratio advantage is obtained through the pinion gears 42 and sun gear 28 to rotate the king pin 16, and accordingly the vehicle tractor, through a much larger angle.

Any of the known follower and steering control valve arrangements may be used with the described system.

It is to be understood that certain modifications and improvements are within the spirit and scope of this invention and that such improvements and modifications as are not specifically excluded by the appended claims, even though not illustrated in the preferred embodiment of this invention, are to be considered as inclusive herewithin.

We claim:

1. A steering mechanism, comprising; a king pin member secured to a vehicle tractor, a hub member rotatably supported on said king pin member and secured to a vehicle trailer member, a sun gear provided on said king pin, a planet gear carrier provided on said hub member and rotatable therewith, planet gears provided on said carrier and engaged with said sun gear, a ring gear operatively disposed in engagement with said planet gears, and drive means engaged between said ring gear and said trailer member for rotation of said ring gear, said drive means includes lever arms engaged to said ring gear and power cylinder means engaged between said trailer and said lever arms.

2. A steering mechanism, comprising; a king pin member secured to a vehicle tractor, a hub member rotatably supported on said king pin member and secured to a vehicle trailer member, a sun gear provided on said king pin, a planet gear carrier provided on said hub member and rotatable therewith, planet gears provided on said carrier and engaged with said sun gear, a ring gear operatively disposed in engagement with said planet gears, and drive means engaged between said ring gear and said trailer member for rotation of said ring gear, wherein said drive means includes lever arms secured to diametrically opposite sides of said ring gear and short-stroke double-acting power cylinder means engaged to said trailer and with said lever arms for cooperative clockwise and counterclockwise rotation of said ring gear.

3. A steering mechanism, comprising; a king pin assembly including a hub connected to a trailer frame and a vertical king pin connected to a tractor and journalled within said hub for steering movements about a vertical axis, a pinion gear member provided on said king pin, a planet gear carrier provided on said hub, planetary pinion gears provided on said gear carrier and disposed for meshing engagement with said sun gear, a ring gear supported on said carrier for relative rotation with respect thereto and having internal teeth engaged with said planetary gears, lever arms secured to diametrically opposite sides of said ring gear, and double acting fluid cylinder means engaged between said trailer and said lever arms.

References Cited in the file of this patent

UNITED STATES PATENTS 2,706,010    Corsini _____ Apr. 12, 1955